(No Model.)

J. S. COEY.
SINKER FOR FISH NETS.

No. 508,681.  Patented Nov. 14, 1893.

WITNESSES:
L. Douville,
P. F. Cragle.

INVENTOR
John Smiley Coey
BY John A. Wiedersheim,
ATTORNEY.

United States Patent Office.

JOHN SMILEY COEY, OF NEWARK, NEW JERSEY.

SINKER FOR FISH-NETS.

SPECIFICATION forming part of Letters Patent No. 508,681, dated November 14, 1893.

Application filed January 31, 1893. Serial No. 460,223. (No model.)

*To all whom it may concern:*

Be it known that I, JOHN SMILEY COEY, a citizen of the United States, residing at Newark, in the county of Essex, State of New Jersey, have invented a new and useful Improvement in Sinker-Cords for Fish-Nets, which improvement is fully set forth in the following specification and accompanying drawings.

My invention consists of a sinker cord for a fish net, formed of a cord proper, and a piece of weighting material connected therewith, as will be hereinafter fully set forth.

Figure 1:
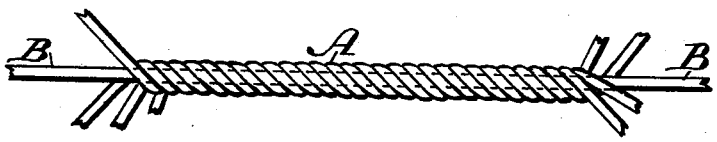
Figure 2:
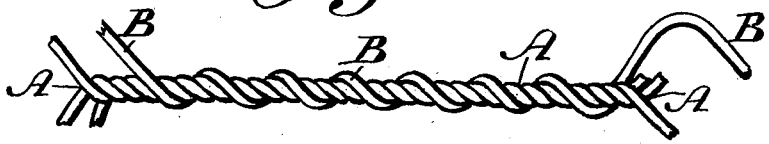
Figure 3:

Figures 1, 2 and 3 represent side elevations of sinker cords embodying my invention, the cord in Fig. 3 being on a reduced scale, and shown connected with a piece of fish net.

Similar letters of reference indicate corresponding parts in the several figures.

Referring to the drawings: A designates a cord which is attached to a fish net in any suitable manner.

B designates a piece of wire formed of lead or other suitable flexible material of sufficiently heavy nature, which in Fig. 1, is inclosed in the cord A, and in Fig. 2 it is wrapped around or twisted with the cord, the cord in either case being a weighted strand, so as to properly sink the net to which it is attached, it being evident that separate weights are dispensed with, and their objectionable features obviated, and as the weighting material is flexible in its nature, the cord may be rolled up, packed and handled in a convenient manner, while a serviceable and practical device is produced.

Having thus described my invention, what I claim as new, and desire to secure by Letters Patent, is—

1. A sinker cord for a fish net having a continuous strand of flexible metal connected therewith, substantially as described.

2. A sinker cord for a fish net provided with a weighting device, consisting of a strand of flexible metal or material of a sufficiently heavy nature, substantially as described.

3. A sinker cord consisting of an inner strand of metal and a covering of cord proper, substantially as described.

JOHN SMILEY COEY.

Witnesses:
 H. W. THURSTON,
 JOSEPH DAVIES.